(12) United States Patent
Yamada

(10) Patent No.: US 7,835,024 B2
(45) Date of Patent: Nov. 16, 2010

(54) PRINT INFORMATION PROCESSING APPARATUS

(75) Inventor: Satoru Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1085 days.

(21) Appl. No.: 11/527,593

(22) Filed: Sep. 27, 2006

(65) Prior Publication Data

US 2007/0216934 A1    Sep. 20, 2007

(30) Foreign Application Priority Data

Mar. 17, 2006    (JP) ............... 2006-075260

(51) Int. Cl.
*G06F 15/00* (2006.01)
*G06F 15/16* (2006.01)

(52) U.S. Cl. ..................... 358/1.15; 709/203

(58) Field of Classification Search ............... 358/1.15, 358/1.16, 1.14, 1.18, 434, 1.13; 705/41, 705/43, 62, 71; 726/15, 16, 18, 23, 26, 28; 382/100, 175, 276; 400/62, 88; 725/32, 725/76, 133; 709/203, 217, 220, 229
See application file for complete search history.

(56) References Cited

U.S. PATENT DOCUMENTS

2007/0107042 A1* 5/2007 Corona ..................... 726/2
2007/0150420 A1* 6/2007 Iwamoto et al. ........... 705/71

FOREIGN PATENT DOCUMENTS

| JP | 2001-236186 | 8/2001 |
| JP | 2002-014796 | 1/2002 |
| JP | 2005-018494 | 1/2005 |
| JP | 2005-071175 | 3/2005 |
| JP | 2005-108199 | 4/2005 |

* cited by examiner

*Primary Examiner*—Saeid Ebrahimi Dehkordy
(74) *Attorney, Agent, or Firm*—Dickstein Shapiro LLP

(57) ABSTRACT

A print information processing apparatus for performing a printing process is disclosed. The print information processing apparatus is connected to a printer via a network and includes an interface configured to connect a removable recording medium; a data storage unit configured to store encrypted data; a decryption unit configured to read decryption information used to decrypt the encrypted data from the removable recording medium connected to the interface and to decrypt the encrypted data by using the decryption information. In the print information processing apparatus, the decryption unit permits the printing process of the encrypted data only when the removable recording medium is connected to the interface.

5 Claims, 10 Drawing Sheets

PRINT INFORMATION PROCESSING APPARATUS

BACKGROUND OF THE INVENTION

1. Field of the Invention

The present invention generally relates to a print information processing system using a computer for processing print data such as text data, image data, or graphic data, sending the print data to a printer, and thereby causing the printer to print the print data; a print information processing program executed on the print information processing system; and a recording medium on which the print information processing program is stored.

2. Description of the Related Art

Generally, an operating system (OS) is running on a computer. An OS is basic software that enables efficient operation of a computer. An OS provides an application programming interface (API) that enables programs running on the OS to use functions of the OS and to operate hardware devices. When printing data from a computer where an OS is running to a printer, a special program called printer driver software or a printer driver program (hereafter called "printer driver") is used. A printer driver is a kind of software program called by an OS.

When a normal program prints data, the program uses a function of the OS via the API and the OS calls a printer driver. A printer driver generates print data for a printer. For example, a printer driver receives input data such as text, images, or graphics from the OS and translates the input data into a print data description language understandable to a printer. Thus, a program (hereafter called "application") that performs a printing process sends print data such as text data, image data, or graphic data to an OS using an API, and the OS sends the print data to a printer driver. A printer is generally configured to understand one or more print data description languages (hereafter called page description language "PDL") that are defined by printer manufacturers.

For example, PDLs such as the Print Control Language (PCL) and the PostScript language are well-known. A printer driver translates print data into a PDL that a target printer can understand. Print data translated into a PDL (PDL data) can be printed only on a printer that can understand the PDL. For example, print data in the PCL language cannot be printed on a printer that can understand only the PostScript language.

Also, even printers that can understand the same PDL may have different printing properties such as output resolution and the number of colors (color or monochrome). Therefore, PDL data translated from the same print data may differ depending on the printing properties of a printer. In other words, PDL data for printer A may not be able to be printed on printer B. In a general PDL translation process, print data are translated into PDL data understandable to a printer and also converted to suit the printing properties of the printer. As a result, the portability of the print data becomes very low.

Meanwhile, user needs for printing have become diverse and complicated. A conventional printing method, in which an application sends print data to a printer driver and printing is performed immediately, does not satisfy such needs.

For the above reason, there has been a demand for a highly-portable format for print data output by a printer driver. To improve the portability of print data sent from an application to a printer driver, it is necessary to develop a print data format that is independent of PDLs and printers. If a printer driver can translate print data from an application into portable print data (hereafter called "metadata") and save the metadata, for example, as a permanent file, the portability of print data can be greatly improved.

When printing metadata, an application sends the metadata to a printer driver, and the printer driver translates the metadata into printer-specific PDL data according to printer properties. Such a method makes it possible to meet various printing needs.

A relevant technology is disclosed, for example, in patent document 1.

[Patent document 1] Japanese Patent Application Publication No. 2001-236186

However, improved portability of metadata files that are independent of PDLs and printers may result in reduced security of print data. In other words, high portability may cause security problems such as alteration of metadata files and stealing of information in metadata files by data analysis. Such security problems do not generally occur in a printing process where an application sends print data to a printer driver, the printer driver translates the print data into PDL data and immediately sends the PDL data to a printer, and the printer prints the PDL data.

Even in the above case, when a computer and a printer are connected via a network, it is possible to steal information by, for example, sniffing packet data. However, information stealing can be prevented by encrypting PDL data during PDL translation.

SUMMARY OF THE INVENTION

The present invention provides a print information processing apparatus that substantially obviates one or more problems caused by the limitations and disadvantages of the related art.

Embodiments of the present invention provide a print information processing apparatus that prevents unauthorized disclosure of information.

According to an embodiment of the present invention, a print information processing apparatus for performing a printing process which print information processing apparatus is connected to a printer via a network includes an interface configured to connect a removable recording medium; a data storage unit configured to store encrypted data; a decryption unit configured to read decryption information used to decrypt the encrypted data from the removable recording medium connected to the interface and to decrypt the encrypted data by using the decryption information. In the print information processing apparatus, the decryption unit permits the printing process of the encrypted data only when the removable recording medium is connected to the interface.

DESCRIPTION OF THE PREFERRED EMBODIMENTS

Preferred embodiments of the present invention are described below with reference to the accompanying drawings.

A printing system according to embodiments of the present invention includes programs that run on a computer and a printer driver that is a program for generating print data that a printer can print. In an exemplary computer, multiple programs are running on an OS that is basic software for controlling computer hardware. Also, a printer driver that is a program for generating print data for a printer is running on the OS. In embodiments of the present invention, it is assumed that each of the programs running on the exemplary computer has a function to edit or process text or an image displayed on a monitor and a function to display or print the edited text or image on a monitor or a printer. Examples of such programs include a text editor, a spreadsheet, and a graphics program. Each of such programs is called a first application in embodiments of the present invention (hereafter called "application (1)").

The application (1) itself does not translate print data for a printer. Instead, the application (1) sends print data to a printer driver and the printer driver translates the print data into print instructions understandable to the printer and sends the print instructions to the printer. Therefore, the application (1) calls a printer driver at the start of a printing process. A printer driver according to embodiments of the present invention includes two functions. A first function is to process print data from the application (1) and thereby to translate the print data into print instructions. A second function is to display print setting windows in response to a print request from the application (1) which print setting windows prompt a user to make print settings for a printer. In embodiments of the present invention, the first function is called a rendering function and the second function is called an UI (display) function. Also, each of programs other than a printer driver is called an "application".

Figure 1:
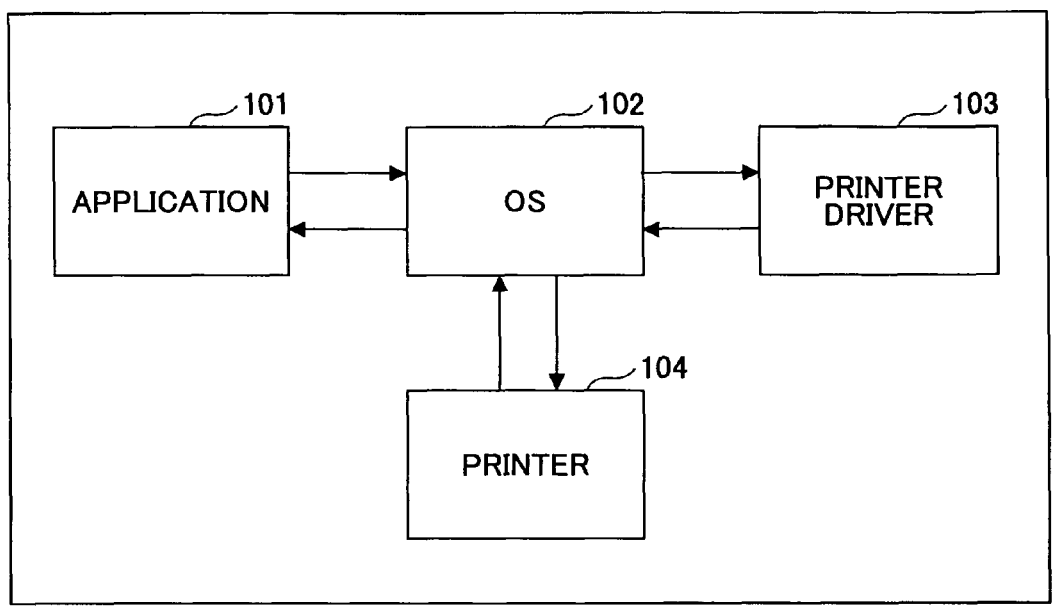
FIG. 1 is a block diagram illustrating an exemplary printing system according to an embodiment of the present invention where a computer and multiple printers are connected via a network.

FIG. 1 is a block diagram illustrating the relationship between an application and the UI function of a printer driver. An application (1) 101 and a printer driver 103 are programs that run on an OS 102. To print data, the application (1) 101 calls a print function of the OS 102. Then, the OS 102 calls an appropriate function of a printer driver. The application (1) 101 may be configured to specify a printer driver to be called by the OS 102. When the printer driver 103 is specified, the OS 102 calls the UI function and the rendering function of the printer driver 103. Then, the printer driver 103 generates print data for a printer 104 and sends the print data to the printer 104.

Figure 2:
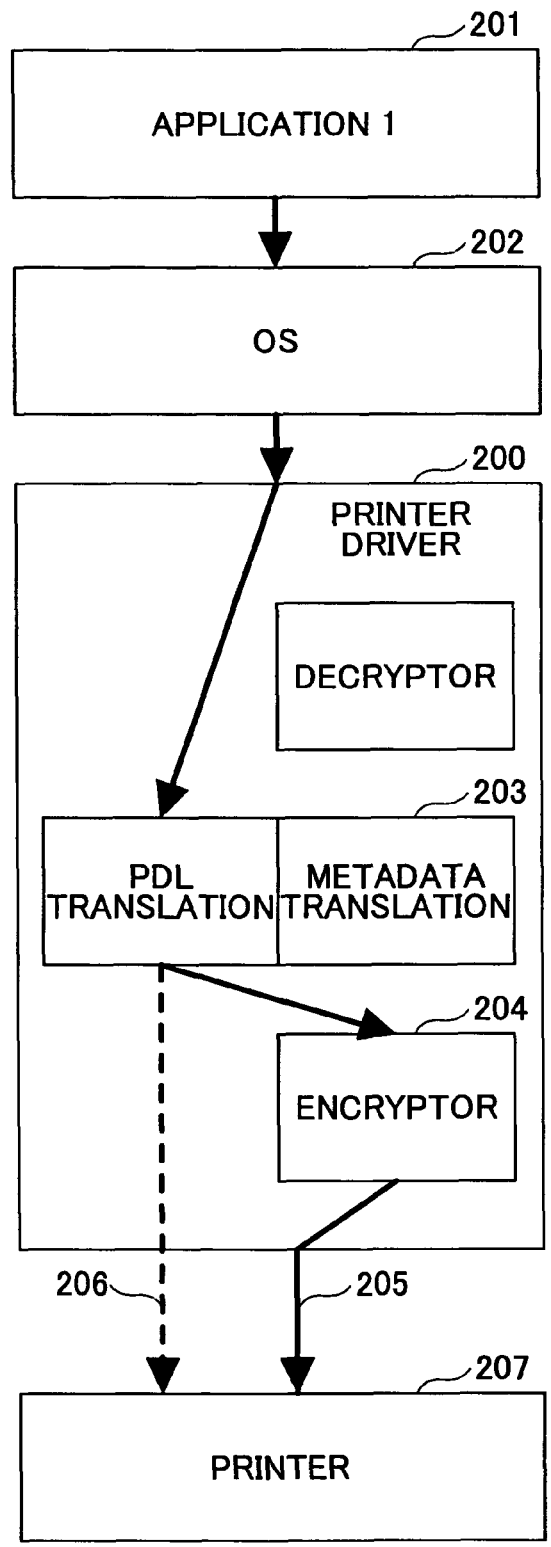
FIG. 2 is a block diagram illustrating an exemplary printing process according to an embodiment of the present invention where a print application (1) prints print data on a printer in a normal manner.

FIG. 2 is a block diagram illustrating an exemplary printing process where an application (1) 201 prints print data on a printer 207 using a printer driver 200. In the exemplary printing process, the application (1) 201 sends print data, such as text data, image data, or vector graphics data to be printed on a printer, via an OS 202 to the printer driver 200. The printer driver 200 receives the print data from the application (1) 201 and a PDL translation unit 203 of the printer driver 200 translates the print data into PDL data understandable to a printer. The PDL data are sent from the exemplary computer to a printer connected with the exemplary computer via a network, a serial interface, or a parallel interface, and are printed on the printer.

In embodiments of the present invention, an exemplary printing system includes the exemplary computer on which the application (1) 201 that performs printing processes and the printer driver 200 are running and a printer connected via a network to the exemplary computer. The exemplary computer and the printer can communicate with each other. In the exemplary printing system, the exemplary computer and a printer may be connected via a wired connection such as USB, IEEE 1394, or IEEE 1284 or via a wireless connection.

In FIG. 2, the exemplary printing system includes the application (1) 201, the OS 202, the printer driver 200, and a printer 207. PDL data generated by the PDL translation unit 203 of the printer driver 200 can be encrypted by an encryptor 204 of the printer driver 200. The encryptor 204 receives and encrypts PDL data from the PDL translation unit 203 and sends the encrypted PDL data to the printer 207 (205). When encryption is not necessary, the PDL data are sent directly to the printer 207 without being sent to the encryptor 204 (206).

First Embodiment

Figure 3:
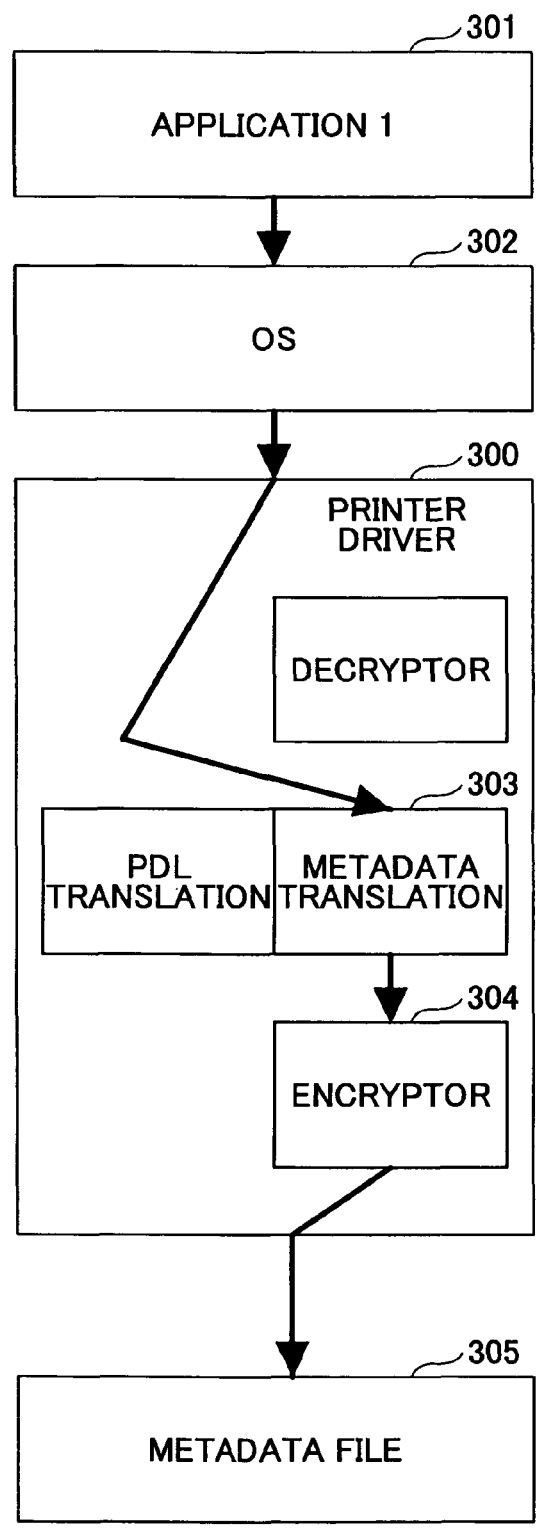
FIG. 3 is a block diagram illustrating an exemplary process according to a first embodiment of the present invention where print data from the print application (1) are translated and saved as a metadata file.
Figure 6:
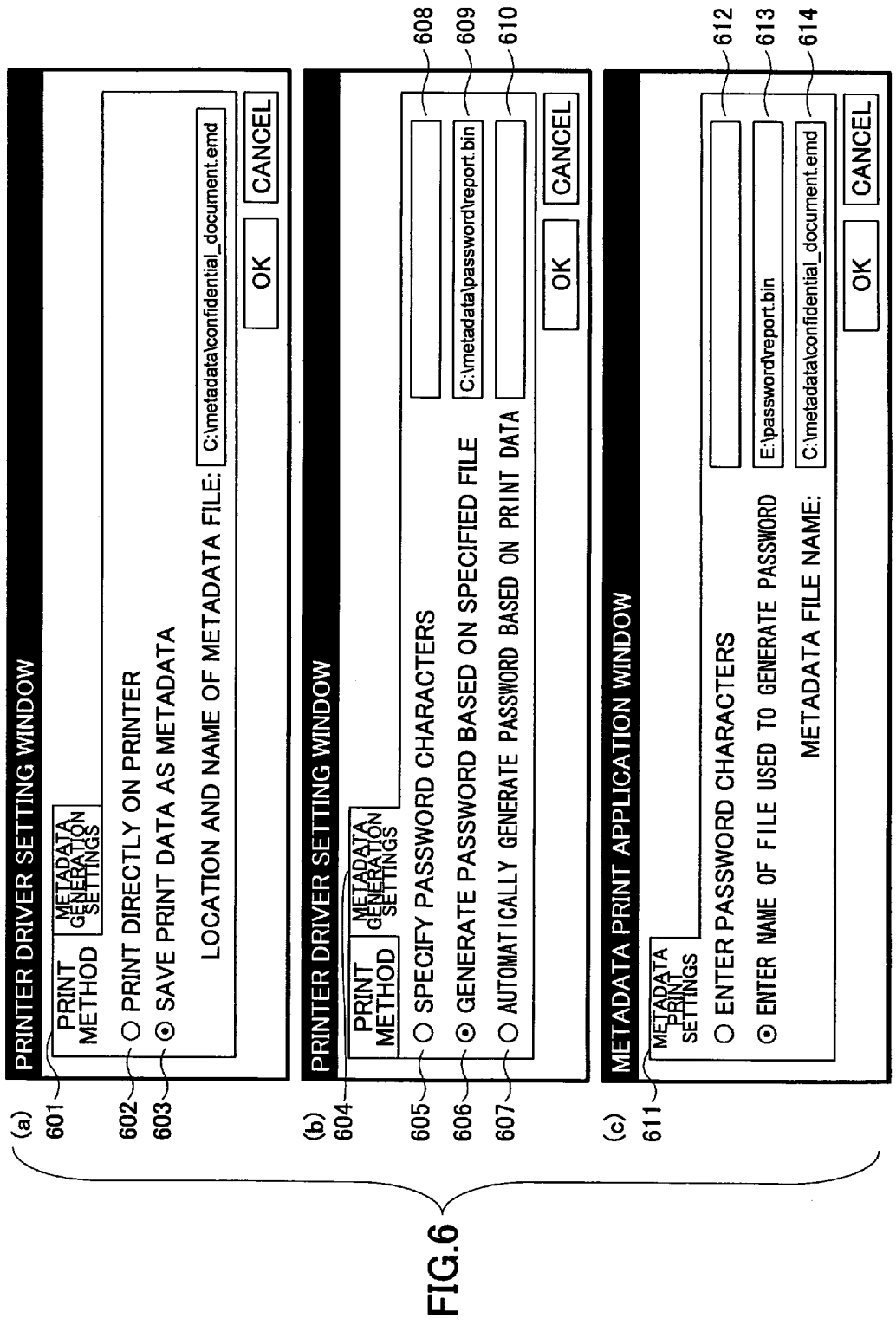
FIG. 6 is a drawing illustrating exemplary setting windows of a printer driver and an exemplary window of a metadata print application according to the first embodiment.

Another exemplary printing process in the above exemplary printing system is described below with reference to FIG. 3. In this exemplary printing process, print data from the application (1) are not directly printed on a printer but instead saved as a metadata file. FIG. 6 shows exemplary printer driver setting windows. Printer driver setting windows can be configured by the GUI of a printer driver. A Print Method tab (601) shown in FIG. 6(a) allows a user to select whether to print directly on the printer 207 or to translate and save print data as a metadata file (203) as shown in FIG. 2.

When "Print directly on printer" (602) is selected on the Print Method tab (601), print data are printed directly on the printer 207. When "Save print data as metadata" (603) is selected, print data are translated and saved as a metadata file. In the latter case, a user is requested to enter in an entry field a metadata file name and a location where the metadata file is to be saved. As shown in FIG. 3, when instructed to save print data as a metadata file, a printer driver 300 receives print data from an application (1) 301 via an OS 302, and a metadata translation unit 303 of the printer driver 300 translates the print data into metadata. Then, an encryptor 304 encrypts the metadata and outputs the encrypted metadata as a metadata file 305 according to the metadata file name and location entered.

The metadata file generated as described above contains the print data from the application (1) in a data format that is independent of printer hardware and a PDL or independent of an apparatus and a language. Therefore, the metadata file can be translated into any PDL and printed on any printer without using the application (1). In other words, the metadata file is highly portable and can be shared among users.

A printing system using a metadata file according to the first embodiment is described below with reference to FIG. 5.

Figure 5:
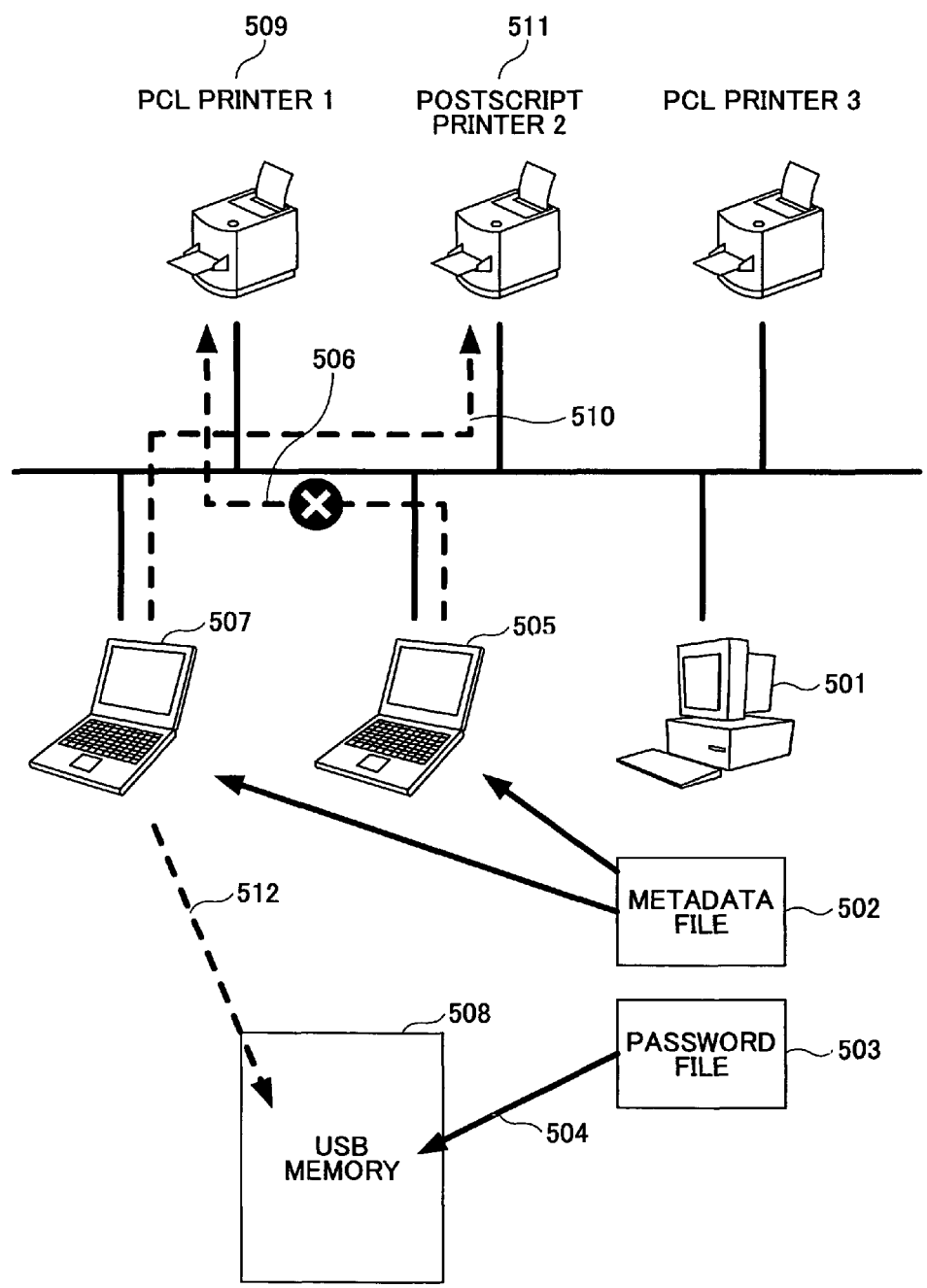
FIG. 5 is a drawing illustrating a relationship between a metadata file and a password file and an exemplary operation method of a printing system according to the first embodiment.

On a computer 501 shown in FIG. 5, the application (1) and a printer driver are running. Also, it is assumed that "Save print data as metadata" (603) is selected on the Print Method tab (601) shown in FIG. 6. A metadata file 502 generated by the computer 501 is stored in a storage device such as a hard disk connected to the computer 501. Also, a password file 503 generated at the same time when the metadata file 502 is generated is also stored in the storage device. The password file 503 is described later. The metadata file 502 can be decrypted by referring to the password file 503. The decrypted metadata file 502 is translated into print data suitable for a target printer and the print data are translated into PDL data that can be printed on the target printer.

An exemplary printing process where a metadata file generated by the computer 501 is copied into a computer 505 and printed by the computer 505 is described below. In the descriptions below, it is assumed that a printer driver that is substantially the same as that on the computer 501 is running on each of the computer 505 and a computer 507. Also, a second application (hereafter called "application (2)") for specifying and printing a metadata file is installed in each of the computers 505 and 507.

Figure 4:
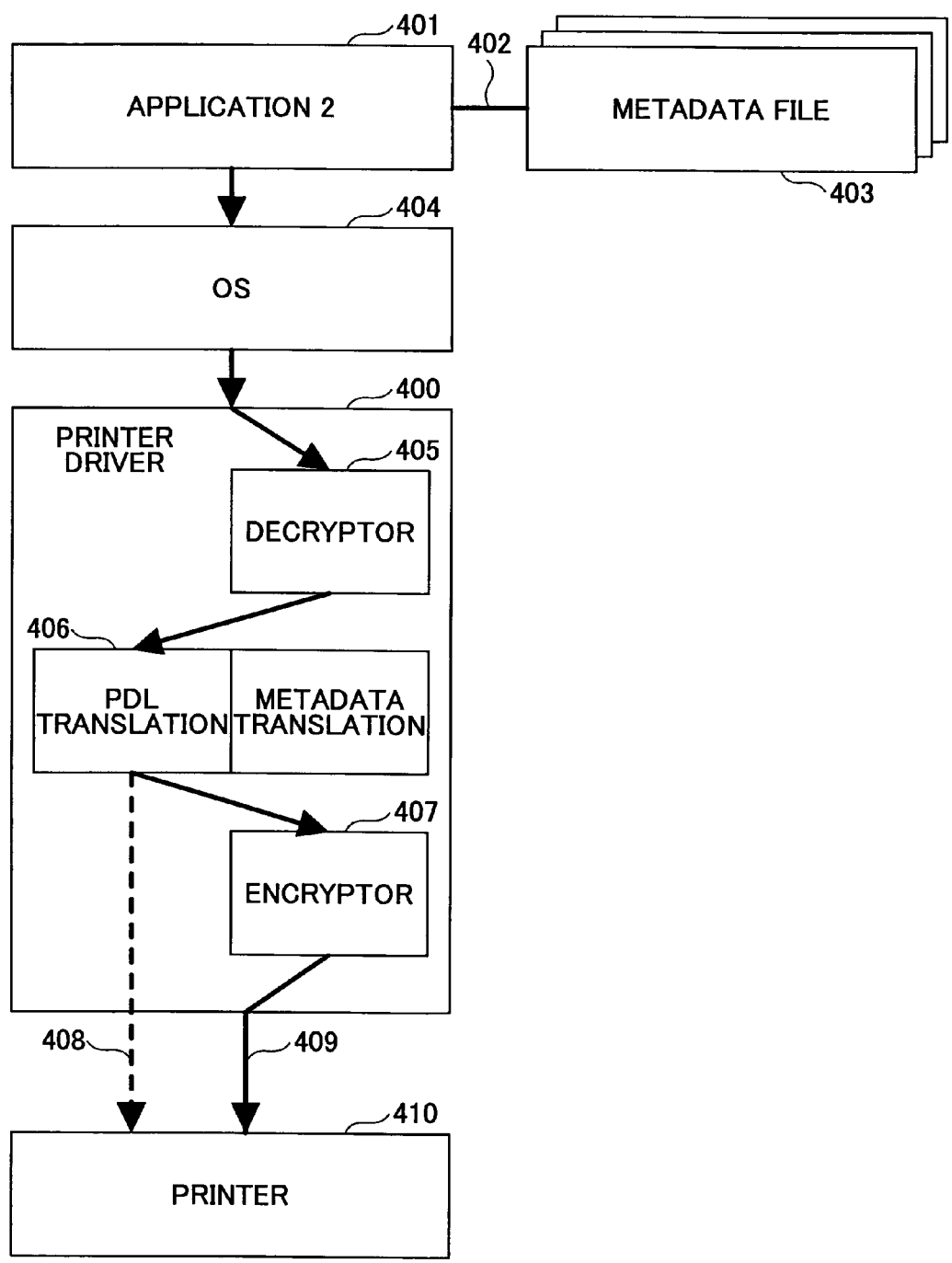
FIG. 4 is a block diagram illustrating an exemplary printing process according to the first embodiment where a print application (2) prints a metadata file.

For example, when printing a metadata file from the computer 505 to a PCL printer (1) 509, an application (2) 401 shown in FIG. 4 sends the metadata file to a printer driver 400, and the printer driver 400 tries to decrypt the metadata file. In this printing process, if the printer driver 400 is not able to refer to the password file 503, the printer driver 400 cannot decrypt and print the metadata file (506). To give a computer access to the password file 503, for example, the password file 503 is stored in a portable recording medium, for example, a USB memory 508 that is attachable/detachable to/from a computer. When printing a metadata file from a computer, the USB memory 508 is attached to the computer. With the USB memory 508, the computer is able to decrypt the metadata file by referring to the password file 503 in the USB memory 508.

An operation method as described above makes it possible to allow only authorized users to print a metadata file and thereby to prevent unauthorized use of the metadata file.

Also, since a metadata file is encrypted, unauthorized viewing of information created by the application (1) and contained in the metadata file can be prevented.

Further, even when an application such as a metadata file viewer is used to handle a metadata file, using a portable/removable recording medium, for example, the USB memory 508 containing the password file 503 makes it possible to prevent unauthorized viewing of information in the metadata file.

For example, when printing a metadata file from the computer 507 to a printer (2) 511, the USB memory 508 is connected to the computer 507. With the USB memory 508, the printer driver 400 in the computer 507 is able to decrypt the metadata file by referring to the password file 503 and to print the metadata file (510). Even in this case, if the USB memory 508 is removed from the computer 507, the printer driver 400 cannot print the metadata file.

Details of a password file described above, a process where the application (1) sends print data to a printer driver and the printer driver generates a metadata file, and a process where the application (2) sends an encrypted metadata file to a printer driver to print the encrypted metadata file are described below with reference to FIG. 6.

To generate a metadata file, a user specifies a method of generating a password on a MetaData Generation Settings tab (604) in a printer driver setting window shown in FIG. 6(*b*). On the MetaData Generation Settings tab (604), the following three password generation methods are provided: entering characters to be used as a password in a password entry field 608 ("Specify password characters" (605)); generating a password based on a specified file (609) ("Generate password based on specified file" (606)); and automatically generating a password based on print data sent from the application (1) to the printer driver ("Automatically generate password based on print data" (607)). When the third password generation method 607 is selected, since the generated password is saved as a file, it is necessary to specify a location where the password file is to be saved (610). When the second password generation method 606 or the third password generation method 607 is specified, instead of using entered characters as a password as in the case of the first password generation method 605, a password is generated based on the information contained in a specified file or print data from the application (1).

In this embodiment, when the second or third password generation method (606 or 607) is specified, a hash value generated by a message digest function is used as a password.

As the encryption algorithm, the Rijndael algorithm of the Advanced Encryption Standard is used. Any message digest function for generating a hash value and any encryption algorithm other than those mentioned in this embodiment may be used for the present invention. The present invention is independent of a particular encryption method, decryption method, and password generation method. When "Generate password based on specified file" (606) is selected, the user is requested to enter the name of an existing file in a file name entry field 609. Based on the information in the specified file, a hash value used as a password for encryption is calculated. When "Automatically generate password based on print data" (607) is selected, a hash value used as a password is calculated based on a part of print data from the application (1). Also, the part of the print data is saved as a file by the file name specified in a password file name entry field 610.

An exemplary process of printing an encrypted metadata file using the application (2) is described below with reference to FIGS. 4 and 6.

On a Metadata Print Settings tab 611 in the metadata print application window of the application (2) 401, a user enters the file name of a metadata file 403 to be printed in a metadata file name entry field 614. Next, the user selects a decryption method. When the password has been specified by entering characters, the user enters the password characters in a password character entry field 612. When the password has been generated based on a specified file (606) or when the password has been automatically generated based on print data (607), the user enters a corresponding file name in a file name entry field 613.

After the above settings, the user executes printing and thereby causes the application (2) 401 to send an encrypted metadata file via an OS 404 to the printer driver 400. The printer driver 400 receives the encrypted metadata file and a decryptor 405 of the printer driver 400 decrypts the encrypted metadata file using the specified password. When a file name has been specified instead of password characters, the application (2) 401 sends information in the specified file to the printer driver 400 before sending the metadata file. Based on the information in the specified file, the printer driver 400 calculates a hash value using the same message digest function as that used in encryption and decrypts the metadata file using the hash value as the password.

Then, a PDL translation unit 406 translates the decrypted metadata file into PDL data taking into account the characteristics of a target printer 410. The PDL data are either sent to the printer 410 after being encrypted again by an encryptor 407 (409) or sent to the printer 410 without encryption (408).

By the way, an automatically generated password is saved in a password generation file for generating a password which password generation file has a certain data length. The password generation file may be made of fixed-length binary data extracted randomly from print data sent from the application (1) to a printer driver or variable-length binary data extracted randomly from print data sent from the application (1) to a printer driver. A password saved as character data may be characters generated based on data randomly extracted from the binary data in the password generation file or may be a hash value calculated from the binary data in the password generation file. Also, when password data to be given to a printer driver from the application (2) are saved in the password file 503 as automatically generated character data, the decryptor 405 may use the character data in the password file 503 as password data.

Second Embodiment

Figure 8:
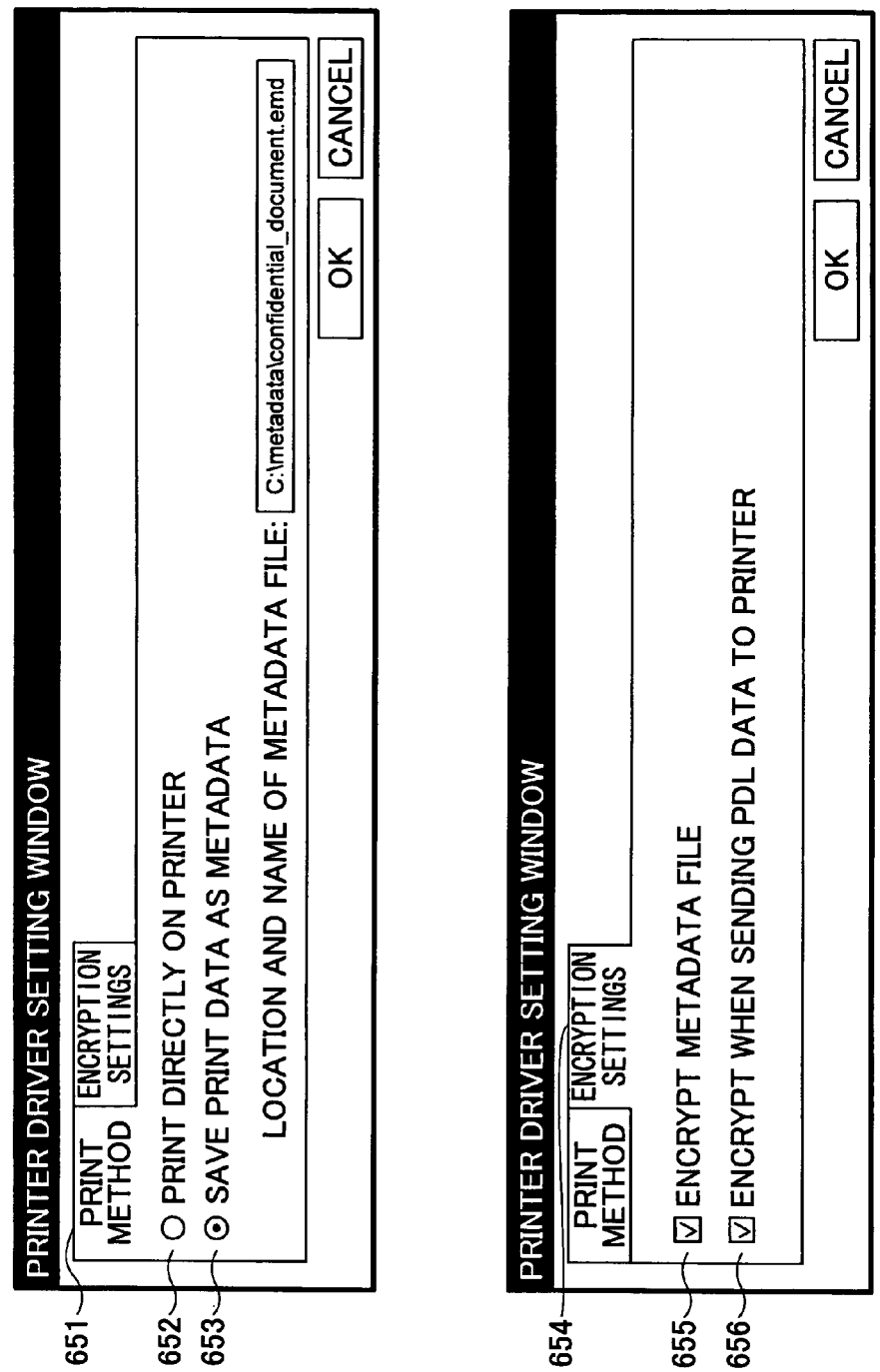
FIG. 8 is a drawing illustrating exemplary setting windows of a printer driver according to the second embodiment.

Still another exemplary printing process in the above exemplary printing system is described below with reference to FIG. 3. Also in this exemplary printing process, print data from the application (1) are not directly printed on a printer but instead saved as a metadata file. FIG. 8 is a drawing illustrating exemplary setting windows of a printer driver. As described with reference to FIG. 2, the Print Method tab (611) allows a user to select whether to print directly on a printer or to save print data as a metadata file. Similarly, when "Print directly on printer" (652) is selected on the Print Method tab (651), print data are printed directly on a printer. When "Save print data as metadata" (615) is selected, print data are translated and saved as a metadata file. In this case, a user is requested to enter in an entry field a metadata file name and a location where the metadata file is to be saved.

When instructed to save print data as a metadata file, the printer driver 300 receives print data from the first application 301 via the OS 302 and the metadata translation unit 303 of the printer driver 300 translates the print data into metadata. Then, the encryptor 304 encrypts the metadata and outputs the encrypted metadata as the metadata file 305 according to the metadata file name and location entered.

The metadata file generated as described above contains the print data from the application (1) in a data format that is independent of printer hardware and a PDL or independent of an apparatus and a language. Therefore, the metadata file can be translated into any PDL and printed on any printer without using the application (1). In other words, the metadata file is highly portable and can be shared among users.

An exemplary printing process where the metadata file generated by the application (1) is sent again to a printer driver and is printed on a printer is described below with reference to FIG. 4.

An application for sending the metadata file 403 to the printer driver 400 is called the second application or the application (2). The application (2) loads the metadata file 403 (402) and sends the metadata file 403 via the OS 404 to the printer driver 400. In the printer driver 400, when the metadata file has been encrypted, the decryptor 405 decrypts the metadata file and the PDL translation unit 406 translates the decrypted metadata file into PDL data. When encryption is requested, the encryptor 407 encrypts again the PDL data translated by the PDL translation unit 406 and sends the encrypted PDL data to the printer 410 (409). When encryption is not requested, the PDL data are sent directly to the printer 410 (408). When printing from the application (1) or the application (2), a user is able to select whether to encrypt a metadata file and whether to encrypt PDL data on a setting window shown in FIG. 8.

An Encryption Settings tab 654 in the printer driver setting window is used to make settings for the encryption of a metadata file and PDL data. To encrypt a metadata file, a user selects "Encrypt metadata file" (655). To encrypt PDL data, a user selects "Encrypt when sending PDL data to printer" (656).

Figure 10:
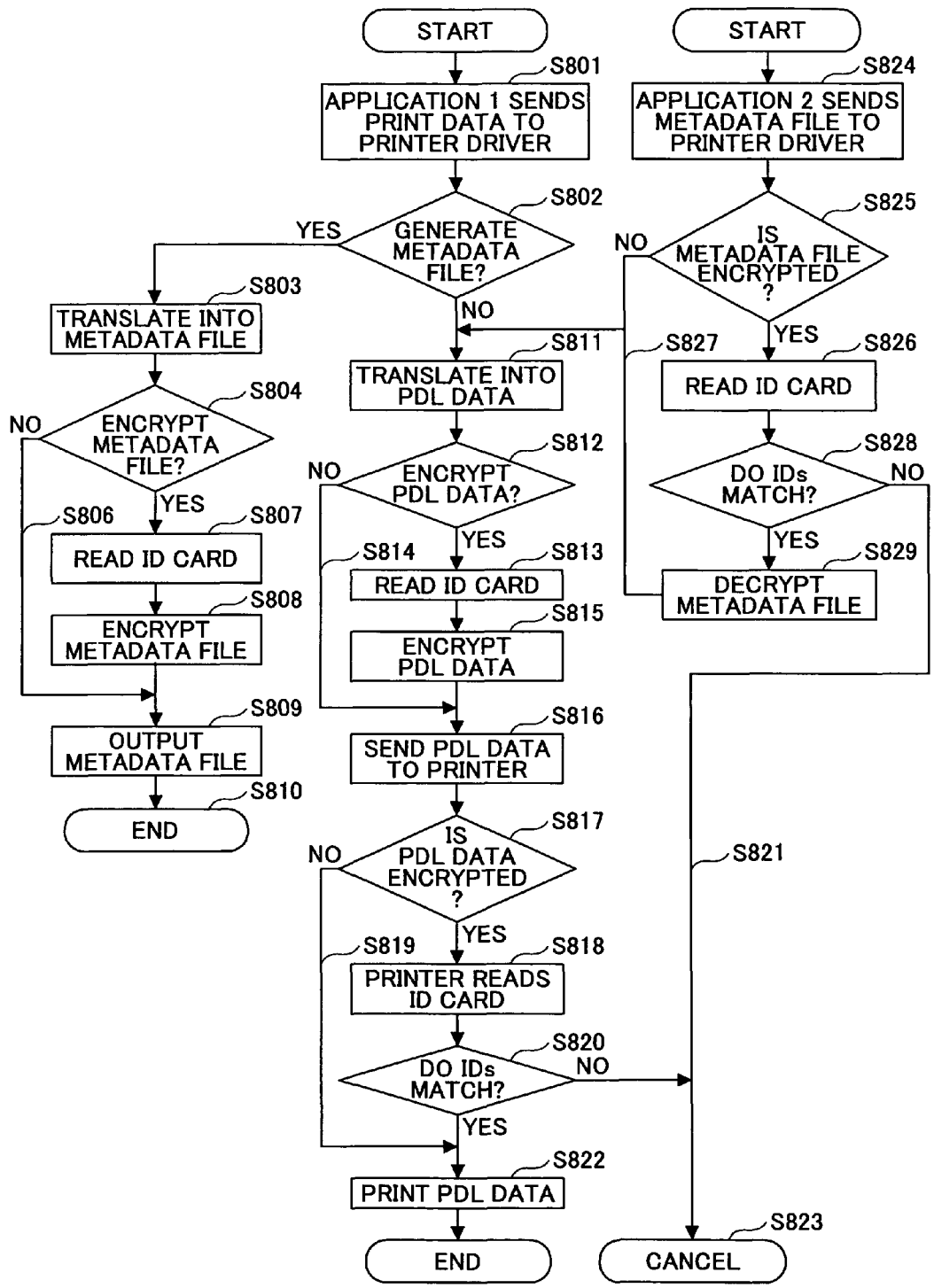
FIG. 10 is a flowchart showing exemplary printing processes according to the second embodiment performed by the application (1) and the application (2) using a printer driver.

In this embodiment, the above settings can be selected independently and the following four combinations are possible:

(1) Metadata are encrypted and PDL data are encrypted
(2) Metadata are not encrypted and PDL data are encrypted
(3) Metadata are encrypted and PDL data are not encrypted
(4) Metadata are not encrypted and PDL data are not encrypted A detailed printing process is described below with reference to FIG. 10 based on the operations of the application (1) and the application (2) described above.

(1) Print data from the application (1) are not translated into a metadata file, but are translated directly into PDL data and printed on a printer The application (1) sends print data such as text, images, or graphics to a printer driver (step S801). In this case, a user selects "Print directly on printer" (612) on a printer driver setting window. The printer driver receives the print data from the application (1) and determines whether to generate a metadata file or generate and print PDL data (step S802). When it has been specified to generate PDL data, the printer driver translates the print data into PDL data (step S811). The printer driver then refers to the setting on the Encryption Settings tab 654 in the printer driver setting window. When it has been specified to encrypt the PDL data, the printer driver reads an ID card in a card reader connected to a computer where the printer driver is running (step S813).

Figure 9:
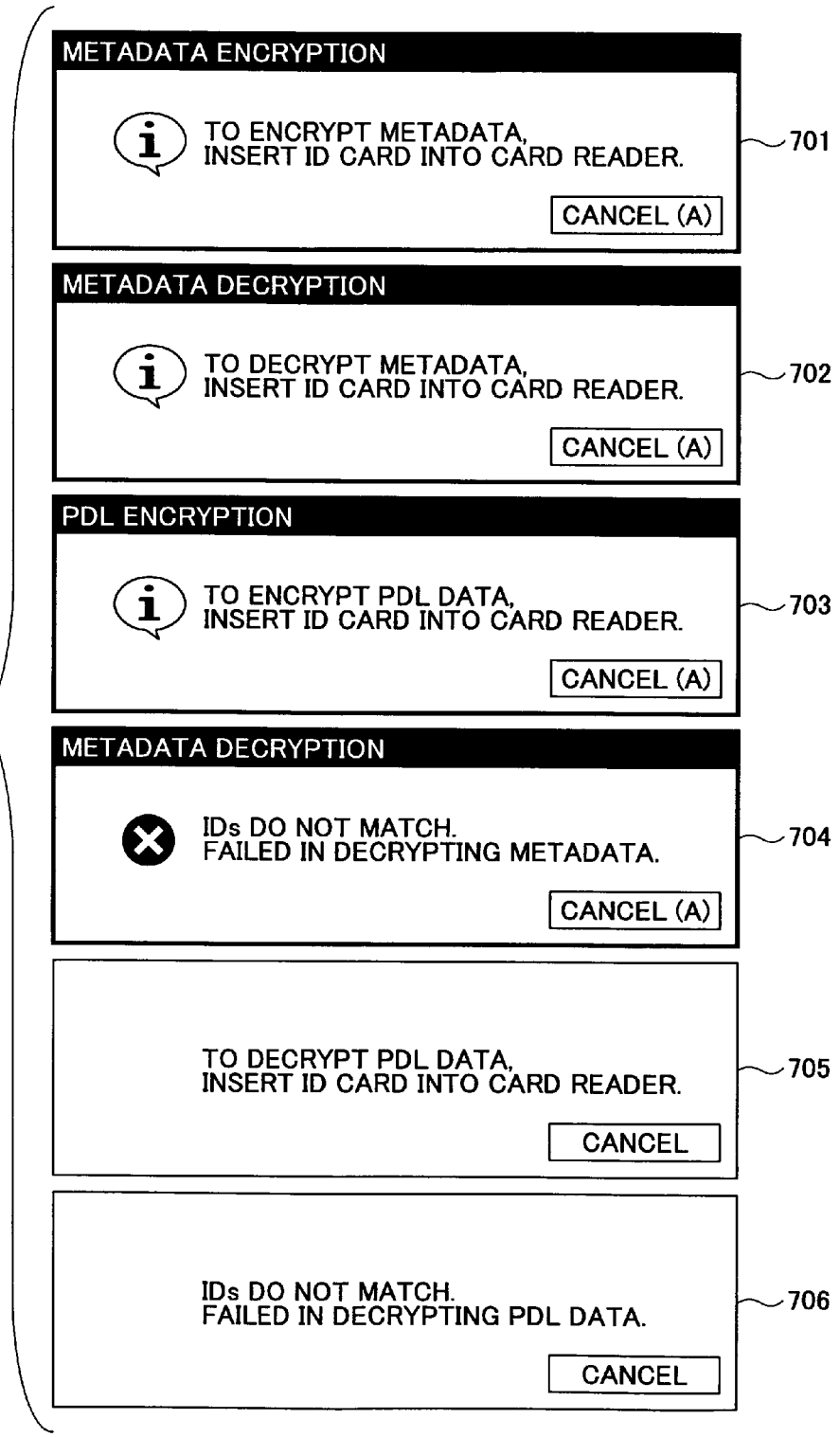
FIG. 9 is a drawing illustrating exemplary windows prompting a user to insert an ID card into a card reader according to the second embodiment.

FIG. 9 is a drawing illustrating exemplary windows prompting a user to insert an ID card into the card reader. When it has been specified to encrypt the PDL data, the printer driver displays a PDL Encryption window 703 and waits until the user inserts an ID card. When an ID card is detected, the printer driver encrypts the PDL data according to data recorded in the ID card (step S815). In this embodiment, a hash value calculated from the data in the ID card is used as an encryption key (characters). When it has been specified not to encrypt the PDL data, the printer driver does not perform (step S814) the reading of the ID card (step S813) and the encryption of the PDL data (step S815).

After encrypting the PDL data, the printer driver sends the encrypted PDL data to a printer (step S816). After receiving the PDL data, the printer determines whether the PDL data are encrypted (step S817). When the PDL data are encrypted, the printer displays a window 705 on its display to request the user to insert an ID card for decryption and waits until an ID card is inserted into a card reader connected to the printer (step S818). When an ID card is inserted into the card reader, the printer reads the data in the ID card, calculates a hash value as in the encryption step, and compares the calculated hash value with the hash value obtained in the encryption step (step S820). When the hash values do not match, the printer displays a window 706 reporting the mismatch between the hash values (IDs) and cancels the printing process (step S823). When the hash values (IDs) match, the printer prints the PDL data (step S822). When the PDL data are not encrypted, the reading of the ID card (step S818) and the comparison of IDs (step S820) are not performed and the PDL data are printed.

(2) Print data from the application (1) are translated into a metadata file

An exemplary process where print data from the application (1) are translated into a metadata file is described below.

In this case, a user selects "Save print data as metadata" (603) on the Print Method tab (651) and enters a metadata file name. As in the case (1) where print data from the application (1) are not translated into a metadata file but are translated directly into PDL data, the application (1) sends print data such as text, images, or graphics to a printer driver. When the print data are received from the application (1), the printer driver translates the print data into a metadata file according to the above setting (step S803). Next, the printer driver determines whether to encrypt the metadata file according to the setting of "Encrypt metadata file" (655) on the Encryption Settings tab 654 in the printer driver setting window (step S804).

When it has been specified to encrypt the metadata file, the printer driver displays a Metadata Encryption window 701 requesting a user to insert an ID card for encryption. When an ID card is inserted, the printer driver reads data in the ID card, calculates a hash value as in the PDL data encryption step, encrypts the metadata file using the hash value as an encryption key (step S808), and outputs the encrypted metadata file. When "Encrypt metadata file" (655) has not been selected on the Encryption Settings tab 654 in the printer driver setting window, the printer driver outputs the metadata file without encryption (step S806).

(3) A generated metadata file is sent from the application (2) to a printer driver and printed on a printer An exemplary process of printing a generated metadata file using the application (2) is described below.

The application (2) loads a metadata file and sends the metadata file to a printer driver (step S824). The printer driver determines whether the received metadata file is encrypted (step S825). When the metadata file is encrypted, the printer driver decrypts the metadata file. The printer driver displays a Metadata decryption window 702 requesting a user to insert an ID card used for encryption (step S826). The printer driver reads data in the ID card and compares the ID in the ID card with the ID used for encryption (step S828). When the IDs match, the printer driver decrypts the metadata file (step S829). When the IDs do not match, the printer driver cancels the printing process (step S821). When the IDs match or the metadata file is not encrypted, the printer driver passes the metadata file to the PDL translation unit (step S827) and the PDL translation unit translates the metadata file into PDL data (step S811).

Figure 7:
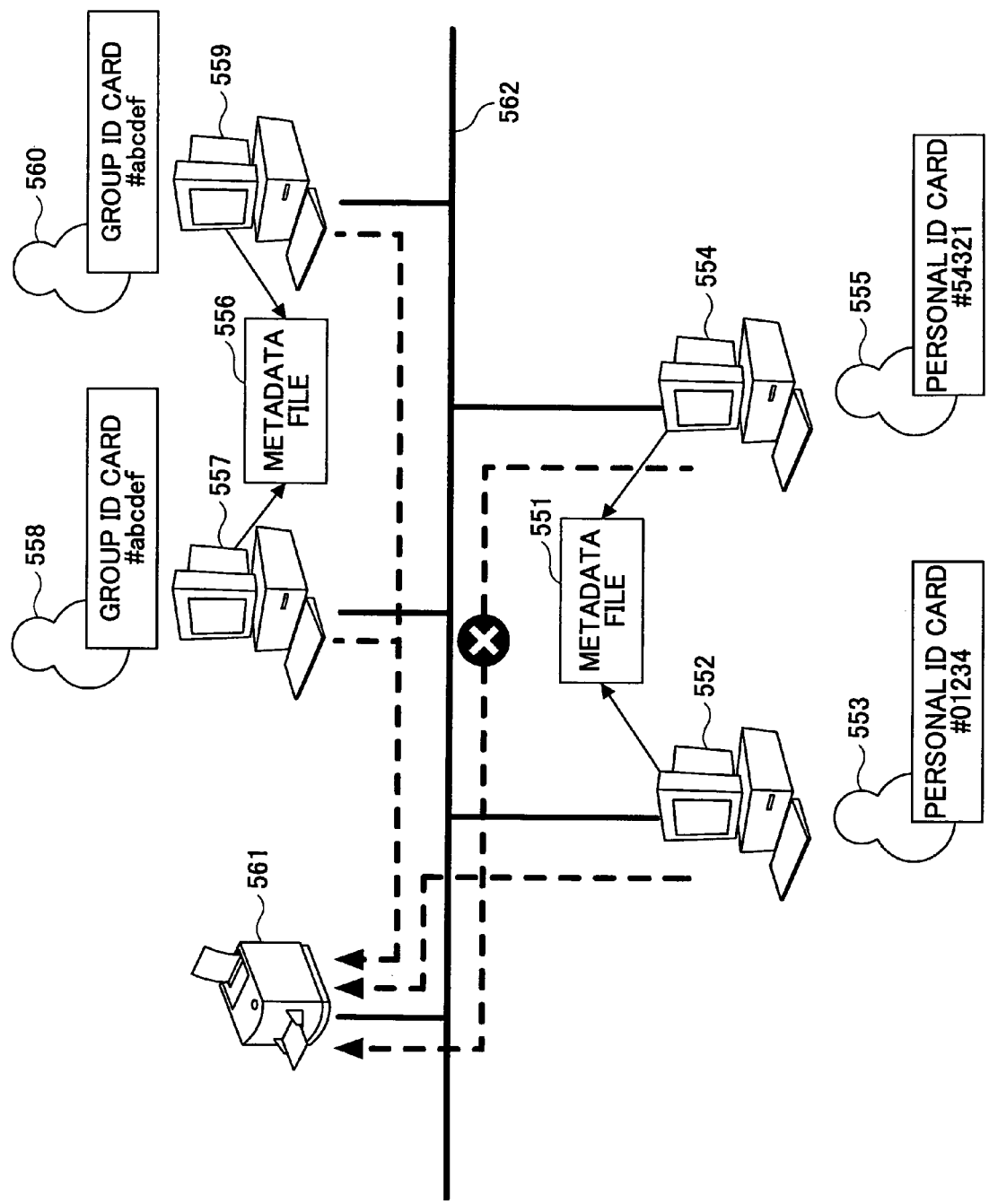
FIG. 7 is a drawing illustrating a method of using metadata files according to a second embodiment of the present invention.

Exemplary operational methods of a printing system using metadata files according to the second embodiment are described below with reference to FIG. 7. First, an exemplary method of encrypting a metadata file using a personal ID card is described below. In this exemplary method, it is assumed that a user 553 has generated a metadata file 551 on a computer 552 using a personal ID card. The metadata file 551 is accessible from computers connected to a network 562. To print the metadata file 551 using the application (2) on the computer 554, a user 555 tries to decrypt the metadata file 551 using a personal ID card. However, since the ID of the ID card used for encryption and the ID of the ID card used for decryption are different, the user 555 cannot print the print data in the metadata file 551. For the same reason, a user 558 and a user 560 cannot print the metadata file 551. In other words, the metadata file 551 can be decrypted only with the ID card of the user 553 and therefore only the user 553 can print the metadata file 551.

Next, an exemplary method of encrypting a metadata file using an ID card containing a group ID is described below. In this exemplary method, it is assumed that the user 558 has generated a metadata file 556 using an ID card containing a group ID. When the user 560 belongs to the same group as that of the user 558 and has an ID card containing the same group ID, the user 560 can decrypt and print the metadata file 556. However, users belonging to different groups cannot use or print the metadata file 556.

Operational methods as described above make it possible to improve portability and security of print data at the same time.

As described above, embodiments of the present invention make it possible to:

1) Read data recorded in a card using a card reader connected to a computer, and encrypt or decrypt print data by a PDL encryption unit using the data read from the card.

2) Read data recorded in a card using a contact or contactless card reader, and encrypt or decrypt print data based on the data read from the card.

3) Read data recorded in a card using a card reader before first PDL data are generated by a first printing unit or second PDL data are generated by a second printing unit, and encrypt the first PDL data or the second PDL data by a PDL encryption unit using the data read from the card.

4) When second PDL data generated beforehand are received by a printer driver, read data recorded in a card using a card reader, and decrypt the second PDL data by a PDL decryption unit using the data read from the card.

5) Use a group ID or a personal ID as the data recorded in a card to be read using a card reader.

6) When first PDL data have been encrypted according to an encryption setting, read data from a card used for the encryption with a card reader connected to a printer, decrypt the first PDL data using the data read from the card, and print the first PDL data.

7) When first PDL data sent to a printer have not been encrypted according to an encryption setting, print the first PDL data even if a card reader is not connected to the printer.

The present application is based on Japanese Priority Application No. 2006-075260, filed on Mar. 17, 2006, the entire contents of which are hereby incorporated herein by reference.

What is claimed is:

1. A print information processing apparatus for performing a printing process which print information processing apparatus is connected to a printer via a network, comprising:
   an interface configured to connect a removable recording medium;
   a data storage unit configured to store encrypted data;
   a decryption unit configured to read decryption information used to decrypt the encrypted data from the removable recording medium connected to the interface and to decrypt the encrypted data by using the decryption information, wherein the decryption unit permits the printing process of the encrypted data only when the removable recording medium is connected to the interface; and
   wherein said apparatus further comprises a print reception unit configured to receive a print instruction to print the encrypted data; wherein the decryption unit permits the printing process of the encrypted data only when the print instruction is received by the print reception unit and the removable recording medium is connected to the interface.

2. The print information processing apparatus as claimed in claim 1, wherein the printing process is a process of translating the decrypted encrypted data into data understandable to the printer.

3. The print information processing apparatus as claimed in claim 1, further comprising: an encryption unit configured to encrypt input data, wherein the encryption unit reads encryption information used to encrypt the input data from a removable recording medium connected to the interface and encrypts the input data by using the encryption information.

4. A print information processing apparatus for performing a priming process which print information processing apparatus is connected to a printer via a network, comprising:
   an interface configured to connect a removable recording medium;
   a data storage unit configured to store encrypted data;
   a decryption unit configured to read decryption information used to decrypt the encrypted data from the removable recording medium connected to the interface and to decrypt the encrypted data by using the decryption information, wherein the decryption unit permits the printing process of the encrypted data only when the removable recording medium is connected to the interface; and
   an encryption unit configured to encrypt input data, wherein the encryption unit reads encryption information used to encrypt the input data from a removable recording medium connected to the interface and encrypts the input data by using the encryption information; and
   wherein the input data are translated into data with a format that is independent of a specific printer before being encrypted by the encryption unit.

5. A print information processing apparatus for performing a printing process which print information processing apparatus is connected to a printer via a network, comprising:
   an interface configured to connect a removable recording medium;
   a data storage unit configured to store encrypted data;
   a decryption unit configured to read decryption information used to decrypt the encrypted data from the removable recording medium connected to the interface and to decrypt the encrypted data by using the decryption information, wherein the decryption unit permits the printing process of the encrypted data only when the removable recording medium is connected to the interface; and
   an encryption unit configured to encrypt input data, wherein the encryption unit reads encryption information used to encrypt the input data from a removable recording medium connected to the interface and encrypts the input data by using the encryption information; and
   wherein the input data include print data, and the encryption information and the decryption information are generated based on the print data.

* * * * *